United States Patent

[11] 3,600,960

[72] Inventors Erhardt Karig;
Otto Dittrich; Manfred Rattunde, all of Bad Homburg, Germany
[21] Appl. No. 887,007
[22] Filed Dec. 22, 1969
[45] Patented Aug. 24, 1971
[73] Assignee Reimers Getriebe A. G.
Zug, Switzerland
[32] Priority Dec. 24, 1968
[33] Germany
[31] P 18 16 950.1

[54] INFINITELY VARIABLE CONE PULLEY TRANSMISSION
16 Claims, 8 Drawing Figs.

[52] U.S. Cl. .................................................. 74/230.17F,
74/230.17 M
[51] Int. Cl. ................................................... F16h 55/22
[50] Field of Search ......................................... 74/230.17,
230.17 M, 230.17 F, 230.17 E; 11/217 CV

[56] References Cited
UNITED STATES PATENTS
2,891,213   6/1959   Kern ............................ 74/230.17 (F)
3,110,189   11/1963  Steuer .......................... 74/230.17 (F)
3,395,586   8/1968   Kirchner ....................... 74/230.17 (F)

*Primary Examiner*—Leonard H. Gerin
*Attorney*—Jennings Bailey, Jr.

ABSTRACT: A fully hydraulic control mechanism for an infinitely variable cone pulley transmission in which the axially movable conical disk of each pulley is pressed against an endless belt or chain running between the pulleys with a different contact pressure than the corresponding disk of the other pulley. The control mechanism acts at the same time upon the axially movable disks on the driving and driven shafts of the transmission, and the contact pressure of all disks is load-responsive.

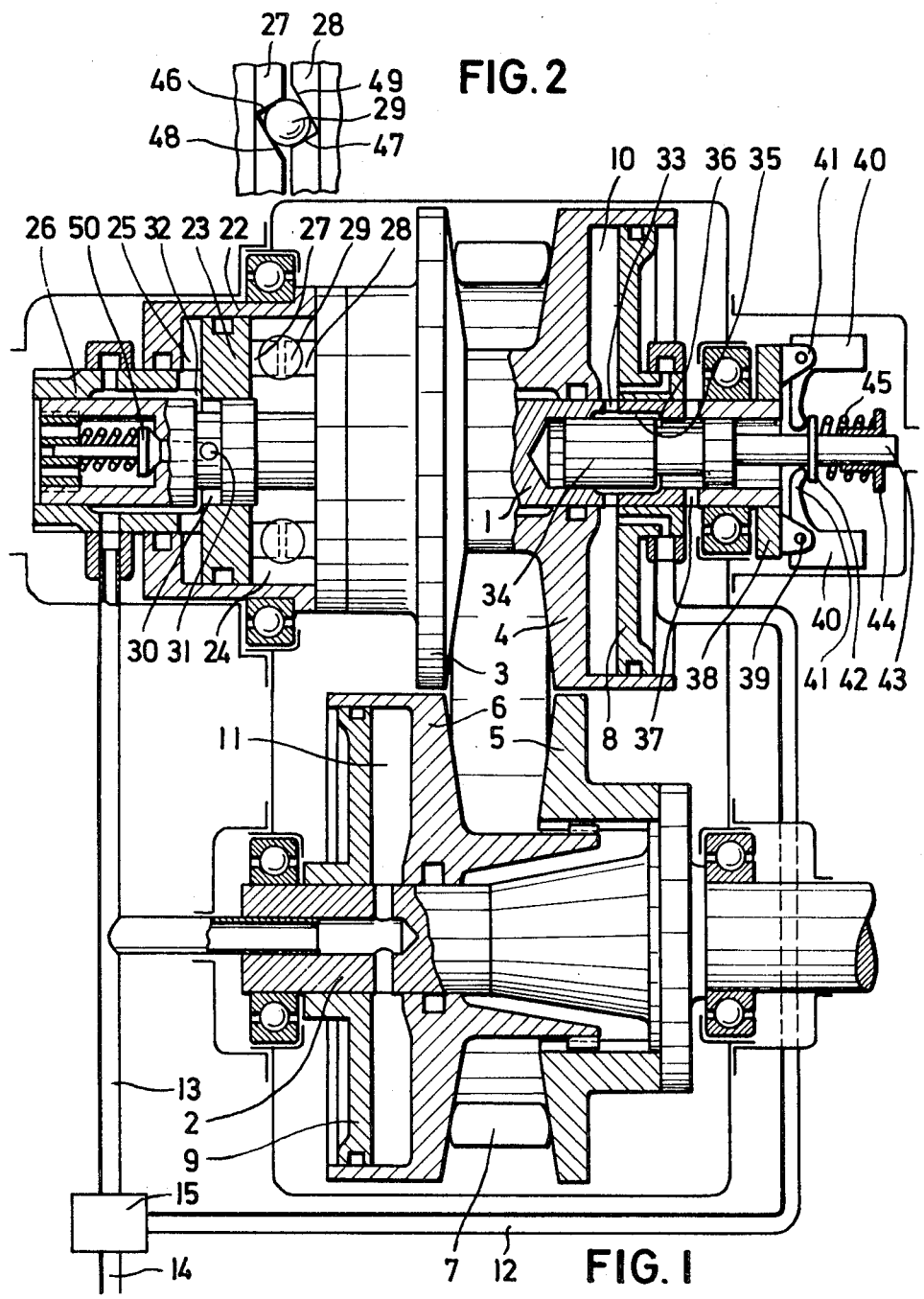

INFINITELY VARIABLE CONE PULLEY TRANSMISSION

FIELD OF THE INVENTION

The present invention relates to an infinitely variable cone pulley transmission which comprises associated pairs of conical disks on the driving and driven sides of the transmission, and an endless transmitting element such as a belt or chain running between these pairs of conical pulley disks. One disk of each pair is slidable in the axial direction on its shaft relative to the other disk and is designed so as to form a rotatable hydraulic cylinder containing a piston which is rigidly connected to this shaft. These conical disks at both sides of the transmission are pressed against the transmitting element with contact pressures which solely depend upon the hydraulic pressure in the cylinders which is automatically produced in a manner so as to be directly responsive to the load which is exerted upon the transmission. This transmission further comprises a distributing slide valve for varying the speed ratio of the transmission and for maintaining the particular ratio to which the transmission is adjusted.

THE PRIOR ART

In a transmission of this known type, as disclosed in the U.S. Pat. No. 3,451,283 and in the copending British application No. 36680/67, the hydraulic pressure fluid such as oil which is supplied from a suitable source under pressure is distributed to the hydraulic cylinders on the axially slidable disks of both sides of the transmission by means of a distributing slide valve which is provided with four control edges and is pivotably connected to a control element which engages upon one of the axially movable conical disks so as to maintain the particular speed ratio to which the transmission is adjusted and which is also adapted to be arbitrarily adjusted by a control lever for varying the speed ratio of the transmission. This transmission is further provided with a control or biasing valve which is inserted into the oil return line through which the oil flows under the hydraulic pressure prevailing at the driven side of the transmission and past the outer control edges of the slide valve.

If the load, for example, upon the driven side of this transmission is suddenly increased, this has the result in view of the well known fact that the transmitting element always exerts a greater spreading force upon the driving disks than upon the driven disks that, since the contact pressure is insufficient with which the axially slidable disk on the driving side is pressed hydraulically against the transmitting element, this disk will yield from the transmitting element, while the axially slidable disk on the driven side will move toward the transmitting element, so that the speed ratio of the transmission is changed and its driven shaft will then run at a lower speed. This yielding movement of the disk on the driving side is transmitted by the control element to the slide valve which is pivotably connected to the latter and is thereby adjusted so as to increase the hydraulic pressure at the driving side of the transmission. This increased hydraulic pressure also acts upon the biasing valve so as also to increase the hydraulic pressure at the driven side so that a general increase of the pressure level on the driving and driven sides of the transmission occurs. This transient pressure variation is stopped when the slide valve is in a position in which the contact pressures which are exerted by the two pairs of conical disks upon the transmitting element balance the spreading forces which this element exerts upon these disks.

These adjusting procedures occur in the reverse direction when the load decreases on the driven side of the transmission and therefore the torque decreases which it has to transmit. It is, however, common to all of these adjusting procedures that an increase or decrease of the hydraulic pressure at the driven side of the transmission can never occur by means of the control or biasing valve until a corresponding increase or decrease of the hydraulic pressure at the driving side has already occurred due to the adjustment of the slide valve. Differently expressed, this means that the variation of the torque which is conducted through the transmission cannot simultaneously affect the height of the hydraulic pressure at the driving and driven sides of the transmission as as to attain a very quick response to the new load conditions, but that the fully hydraulic system of the known type for attaining the required contact pressures operates only with a certain sluggishness or time lag which is of disadvantage especially if very quick changes occur in the strength or the direction of the load which acts upon the transmission.

The transmission as previously described has the further disadvantage that an accurate adaptation of the contact pressure on the driven side of the transmission to the actual requirements can occur only if the power output is relatively small since the graphically plotted course of the required contact pressure in the form of a straight line intersects the curved course of the generated contact pressure, which means that subsequent to the time of this intersection when tending toward higher torques a slipping of the transmission will occur. Although it is possible to adjust the slipping point so as to occur at higher torques, this means that within the lower load range the contact pressure will be much higher than required and that by applying such an excessive contact pressure the efficiency of the transmission will be unsatisfactory and the degree of wear and tear upon the transmission will be too high so that useful life of the transmission will be relatively short.

It is one of the laws of all infinitely variable cone pulley transmissions that the ratio between the contact pressures at their driving and driven sides varies within certain limits in response to the particular load to which it is subjected and in response to the speed ratio to which it is adjusted. In the known types of transmissions as disclosed in the German Pat. No. 1,081,733, in which the contact pressures are produced at least partly mechanically, it is therefore necessary to provide a number of very complicated mechanical pressure-producing means so that the contact pressures produced will not only be load-responsive but also responsive to the particular speed ratio to which the transmission is adjusted. In many cases, however, the contact pressures which have to be produced only need to be responsive to the particular load to which the transmission is subjected and it is therefore only necessary to make suitable provisions to prevent these solely load-responsive contact pressures from causing a slipping between the transmitting element and the conical disks when the pressure ratio between the driving and driven side of the transmission is the most unsuitable. Such a slipping of the transmitting element relative to the conical disks would likewise render the transmission useless prematurely.

SUMMARY OF THE INVENTION

It is an object of the present invention to provide an infinitely variable cone pulley transmission of the type in which the contact pressure of the conical disks at the driving and driven sides of the transmission upon the transmitting element are produced solely hydraulically and which overcomes the disadvantages of the known transmission as previously described, and which for reasons of a greater simplicity and lower cost of production is designed in a manner which is completely adequate for most practical purposes for the reason that the contact pressures at the driving and driven sides of the transmission only need to be responsive to the load to which the transmission is subjected and not also to the particular speed ratio to which the transmission is adjusted. The transmission according to the present invention should therefore be designed so that the generation of the hydraulic contact pressure which is required at the driven side of the transmission is no longer dependent upon the strength of the hydraulic pressure which prevails at the driving side.

A principal feature of the invention for attaining the above-mentioned object consists in providing at least the driving side of an infinitely variable cone pulley transmission of the type as described at the beginning with a device, hereafter called a "torque indicator," which is adapted to indicate the prevailing strength of the torque acting upon the driving shaft of the transmission and which by a torque-responsive movement of at least two parts relative to each other determines at least the load-responsive hydraulic contact pressure which is required at the driven side of the transmission. This feature of the invention is based upon the finding that the torque which acts upon the driving side of the transmission is substantially proportional to the contact pressure which has to be exerted at the driven side in order to prevent the transmitting element from slipping between the two pairs of conical pulley disks. This feature permits the contact pressure which is required at the driven side of the transmission to be load-responsive and to be produced only hydraulically and in a manner so as not to be affected by the contact pressure which is applied at the driving side of the transmission.

This feature has the further result that graphically speaking the characteristic of the contact pressure which is thus produced at the driven side is rectilinear and that therefore the contact pressure which attainable is approximately equal to the theoretical optimum value, that is, the value at which a slipping of the transmitting element between the conical disks will just be prevented. However, in actual practice the contact pressure is generally made of a strength greater than that of the mentioned optimum value in order to account for variations in friction between the conical disks and the transmitting element.

A cone pulley transmission of the type as described above in which the contact pressures are produced only hydraulically is especially suitable for being applied as a transmission for a motor vehicle because it complies with the special requirements of such a transmission by acting upon the hydraulic pressure and thus also upon the contact pressure which is produced at one side of the transmission without incurring the danger that this action will occur with a delay at the other side of the transmission.

The torque indicator according to the present invention preferably consists of a combination of the following features: The fixed conical disk which is secured to the drive shaft of the transmission is to be provided in the form of a rotatable hydraulic cylinder, and within this cylinder a piston is to be provided which is rotatable together with the cylinder and axially slidable along the shaft and serves for transmitting the torque between the engine and the fixed conical disk. This piston divides the inside of the cylinder into a front chamber which is tightly closed and into a rear chamber which is subjected to the hydraulic pressure which occurs at the driven side of the transmission. Another feature of this torque indicator consists in providing the surface of the piston and the conical disk which are facing each other within the front chamber of this cylinder with cam projections with opposite V-shaped recesses between which balls or rollers are inserted for transmitting the torque. Another feature consists in the provision of a throttling element which determines the hydraulic pressure which acts upon the driven side of the transmission and upon the rear chamber of the mentioned cylinder. This throttling element is adjusted by the piston at the driving side of the transmission in accordance with the position of this piston which varies in accordance with the particular torque to be transmitted. The particular adjustment of this throttling element then insures that the hydraulic pressure which acts upon the driven side and upon the rear cylinder chamber at the driving side will correspond to the hydraulic pressure which is required at the driven side and to that pressure which will balance the axial forces which are exerted by the cam projections and balls upon the piston. For this purpose, it is necessary to make the surface of the piston, the angles of the flanks of the V-shaped recesses, and the radial distance between the cam projections and the axis of the drive shaft of suitable dimensions.

The oil which is supplied under pressure to the rear chamber of the hydraulic cylinder may then pass out of this chamber through a radial bore and a following axial bore in the drive shaft. This radial bore may communicate with a groove in the shaft and one edge of this groove together with a control edge of the piston may form the throttling element. It is, however, also possible to provide a flange projecting from the rear end of the hydraulic cylinder with a surface upon which one end of a two-armed lever engages which is pivotably mounted between its ends and the other end of which actuates a slide valve which is movable against the action of a spring and, by being located within the return line of the oil which is conducted to the driven side and the rear cylinder chamber, throttles the return flow of the oil.

If the torque indicator is designed in this manner, the torque which is transmitted by the cam projections and the balls or rollers therein which are located between the fixed conical disk and the hydraulic piston produces an axial movement of this piston and thus a throttling of the flow of oil which is conducted to the driven side of the transmission and to the rear cylinder chamber of the fixed conical disk. This axial movement and throttling effect is due to the fact that the balls or rollers will then roll up along the flanks of the V-shaped recesses until, due to the throttling of the flow of oil, a hydraulic pressure will be built-up in the rear cylinder chamber which is sufficient to balance the axial forces which are produced by the cam projections and the balls or rollers which are inserted therein. Due to the particular construction of the torque indicator according to the invention this particular pressure is, however, the same which also produces the required contact pressure of the conical disks at the driven side of the transmission.

The torque indicator as previously described is, however, suitable only for such transmission in which a reversal of the direction of the torque is not to be expected and in which therefore the engine side of the transmission is always the driving side and its other side is always the driven side. In order to design this transmission according to the invention so as to be able to transmit the torque alternately in either direction, it has been found advisable to make the two flanks of each V-shaped recess in the cam projections of different inclinations so that the steeper flanks will be acted upon by the balls or rollers when the engine side of the transmission forms its driving side, while the less inclined flanks are acted upon when the normally driven side becomes the driving side of the transmission.

Another embodiment of the torque indicator according to the invention provides that the conical disks on the shaft at the driven side of the transmission are mounted on this shaft by means of a bushing so as to be axially slidable relative to each other and also to be rotatable on the shaft without, however, being rotatable relative to each other. For transmitting the torque between this shaft and the conical disks, this embodiment of the invention provides a spring element which may have a preliminary tension and is mounted between the shaft and one of the disks and acts in their direction of rotation. Another feature of this embodiment of the invention consists in the provision of a throttling element which is adjustable in accordance with the torque-responsive tension of the mentioned spring element and is adapted to determine the hydraulic pressure which acts within the driven side of the transmission. This spring element may be mounted so that its one end acts in the peripheral direction upon the shaft and its other end upon a flange which surrounds the shaft without play and projects from the conical disk which does not form a hydraulic cylinder and is prevented from axially sliding along the shaft in the direction away from the endless transmitting element such as a belt or chain. The mentioned throttling element of this embodiment of the invention consists of a bore in the shaft which extends at first in the axial direction and then in the radial direction, and of a radial bore in the flange of the conical disk which in one position is in axial alignment with the radial part of the bore in the shaft so that both radial bores together form an oil passage. When these two radial bores are slightly turned from this coaxial position relative to each other against the action of the mentioned spring element, the opening between their adjacent ends is restricted and thus forms a throttling passage.

In a transmission according to the invention which is provided with a torque indicator of the structurally very simple and therefore inexpensive type as described above, the torque transmission between the shaft of the driving side and the conical disks on this shaft occurs by means of the spring element. If the torque to be transmitted changes in strength, these changes cause corresponding changes in the rate of compression of the spring element. The conical disks on the driving shaft are thereby turned peripherally to different positions relative to this shaft with the result that by means of the radial bores in the shaft and in the flange of the conical disk which does not form a hydraulic cylinder a load-responsive throttling of the flow of oil occurs which is conducted to the other side of the transmission for producing the required contact pressure of the disks at this other side.

If the cone pulley transmission according to the invention is to be employed in a motor vehicle and if this transmission is provided with a torque indicator and a hydraulic cylinder and piston, the contact pressure which is required on the driving side of the transmission may be produced by supplying oil under pressure to both sides of the transmission independently of each other, by providing the shaft of the driving side on which the hydraulic piston is mounted in a fixed position with an axial bore and with a slide valve in this bore which is adapted to determine the contact pressure of the conical disks at this side of the transmission upon the endless transmitting element for maintaining and changing the speed ratio of the transmission, and by providing a governor which acts upon this slide valve and is controlled by the speed of the shaft of the driving side of the transmission and by the power output of the engine as set, for example, by the accelerator.

If the transmission according to the invention is, however, not to be employed merely for motor vehicles but also for other purposes and if either of the two types of torque indicators are to be employed selectively, it is advisable to provide a slide valve with four control edges for distributing the oil under pressure to both sides of the transmission for maintaining and changing its speed ratio, and to provide the throttling element of the torque indicator in the return line of the excessive amounts of oil flowing from the outer control edges of this slide valve.

Another feature of the invention consists in providing the axially movable conical disks of both sides of the transmission in the form of double-acting hydraulic cylinders in which the pistons are slidable and in which the chamber of the respective cylinder which is located between the piston and the associated conical disk is supplied by a second source of pressure oil with a hydraulic pressure the strength of which is determined by the torque indicator so as to be load-responsive by passing the return flow of the oil which is supplied by the second oil-pressure source through the torque indicator. The cylinder chamber at the other or rear side of the piston of the driven side of the transmission may then be supplied by a slide valve with four control edges with a variable pressure which counteracts the pressure which is supplied by the second oil-pressure source. The contact pressures of the axially movable disks upon the endless transmitting element are therefore generated by a high-pressure system and a low-pressure system. The high-pressure system which acts on both sides of the transmission then insures that the contact pressures will be load-responsive, while the low-pressure system together with the mentioned slide valve insures that the contact pressures at the driving and driven sides of the transmission will be in the proper ratio to each other. This has the advantage that the transmission has a better rate of efficiency since the high-pressure pump only has to be designed so as to convey small quantities of oil, while the larger required quantities of oil may be conveyed by the low-pressure pump. Furthermore, by conducting the hydraulic pressure as supplied by the mentioned slide valve to the driven side of the transmission the advantage is attained that the pressure chambers containing the fixed pistons may be designed so as to act as a differential system which is a much more simple and less expensive construction than one in the form of double-acting pistons which would be required if the foregoing provisions were not made.

The present invention may finally be applied for producing a cone pulley transmission in which both sides may carry out the same functions with substantially equal results and which may therefore be employed in practically all cases which may occur, and which is free of any limitations especially insofar as the direction of the torque is concerned which is to be transmitted. Both sides of the transmission may, for this purpose be of the same construction in which oil under pressure is supplied to both sides independently of each other for the operation of a torque indicator, and in which the load-responsive contact pressures of the side acting as the driving side are determined by the torque which then prevails at the driving side, and in which the amounts of oil of the return flow are conducted to a distributing slide valve with two control edges for maintaining and changing the speed-ratio of the transmission. When employing either of the two types of torque indicators according to the invention it is, however, also possible to provide each side of the transmission with such a throttling element which is adjustable in response to the torque to be transmitted. By the provision of a switch valve which is controlled by the higher hydraulic pressure of the driving side acting upon the slide valve with four control edges, the throttling element of the driving side will be connected to the return line of the oil which flows off past the outer control edges of the slide valve or to the oil supply line which leads to the second source of oil under pressure.

BRIEF DESCRIPTION OF THE DRAWINGS

The aforementioned as well as additional features and advantages of the present invention will become further apparent from the following detailed description thereof which is to be read with reference to the accompanying drawings which show several embodiments of the new infinitely variable cone pulley transmission largely in cross section and partly diagrammatically simplified. In these drawings, FIG. 1 shows a first embodiment of a transmission according to the invention;

FIG. 2 shows a detail view of a pair of the cam projections according to FIG. 1 with an inserted ball, as seen in a radial direction;

FIG. 7 shows a modification of the transmission according to FIG. 4, in which both sides of he transmission are equally designed; while

DESCRIPTION OF THE PREFERRED EMBODIMENTS

Figure 3:
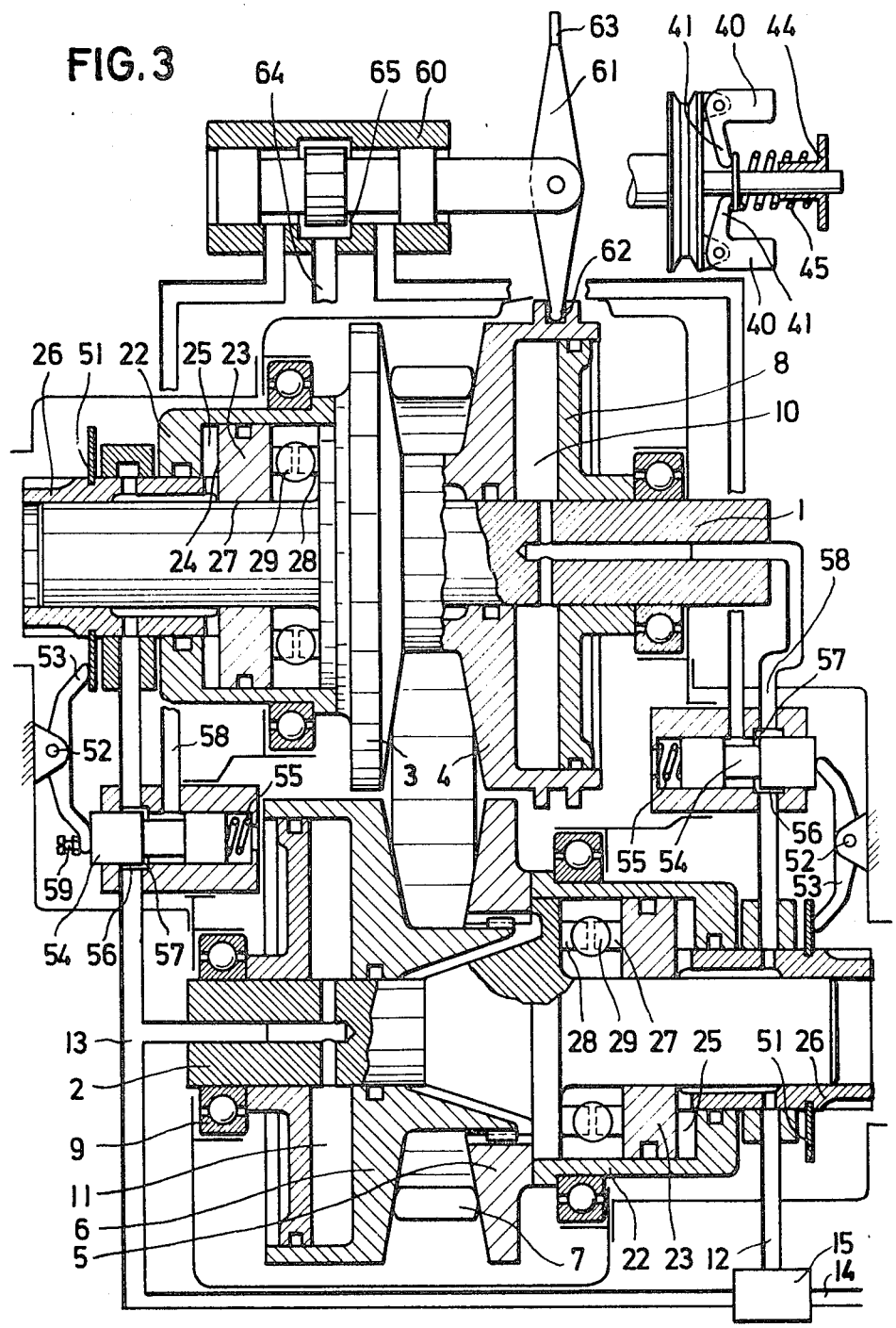
FIG. 3 shows a second embodiment of a transmission according to the invention.

For an easier understanding and comparison of the different embodiments of the invention, all those parts of these embodiments which carry out similar functions are designated in the drawings and are referred to in the following description by the same reference numerals. Thus, each of the transmissions according to the invention as illustrated in the drawings comprises a shaft 1 which is to be connected to a motor or engine and a second shaft 2. Shaft 1 carries a pair of conical disks 3 and 4 and the other shaft 2 carries another pair of conical disks 5 and 6, and these two pairs of disks are connected by an endless transmitting element 7 such as a belt or chain. Disks 4 and 6 are designed in the form of hydraulic cylinders which are movable in the axial directions along the shaft 1 and 2, respectively, and are associated with pistons 8 and 9 which are rigidly secured to these shafts so that between disk 4 and piston 8 and also between disk 6 and piston 9 a pressure chamber 10 or 11 is formed into which oil under pressure may be conducted through conduits 12 or 13, respectively, so as to produce the required load responsive contact pressure upon the transmitting element 7.

In each of the two transmissions as illustrated in FIGS. 1 and 3, this oil is supplied at 14 from a suitable source (not shown) to a flow distributor 15 which divides the flow of oil into two currents the pressures of which are independent of each other and which are conducted through the conduits 12 and 13, respectively.

In the transmission as illustrated in FIG. 1 which is intended for being employed in a motor vehicle, the conical disk 3 which is secured to shaft 1 is provided with a hydraulic cylinder 22 in which a piston 23 is axially slidable and also rotatable relative to shaft 1. This piston 23 divides the area in cylinder 22 into an airtight front chamber 24 and a rear chamber 25, and its end projecting from cylinder 22 forms a flange 26 which is rigidly connected in a manner not shown to the engine of the vehicle. For transmitting the rotary movement which is exerted through flange 26 upon piston 23 to the conical disks 3 and 4 which are nonrotatably connected but slidable in the axial direction relative to each other in a manner as illustrated, piston 23 is provided with a cam projection 27 which projects axially into the front cylinder chamber 24 and is operatively associated with an opposite cam projection 28 on the conical disk 3. These cam members 27 and 28 are provided with inversely corresponding V-shaped recesses into which balls or rollers 29 serving as power transmitting means are inserted.

In the transmitting unit 27 to 29 an axial force is produced which is proportional to the torque which is to be transmitted between the piston 23 and the conical disks 3 and 4 and acts upon piston 23. For this purpose, the oil which is supplied through the conduit 13 to the pressure chamber 11 of the other side of the transmission likewise passes to the rear cylinder chamber 25. The oil then leaves this rear chamber 25 through an annular groove 30 in shaft 1 and then through a bore 31 in shaft 1 which extends at first in the radial direction and then in the axial direction of this shaft. The inner edge 32 of piston 23 and the adjacent edge of the annular groove 30 together define a throttling passage the size of which determines the strength of the hydraulic pressure which prevails in the rear cylinder chamber 25 and in the pressure chamber 11 of the other side of the transmission. The size of the throttling passage and the resulting hydraulic pressure in the mentioned chambers, in turn, depend upon the torque which is to be transmitted between piston 23 and conical disks 3 and 4 since during the transmission of this torque to these disks the balls or rollers 29 in cooperation with the V-shaped recesses in cam projections 27 and 28 move the piston 23 in its axial direction until the inner edge 32 of this piston has throttled the flow of the oil to such an extent that the hydraulic pressure prevailing in the rear cylinder chamber 25 and thus also in the pressure chamber 11 of the other side of the transmission prevents any further axial movement of piston 23.

In view of the fact that the torque which is transmitted between the piston 23 and the conical disks 3 and 4 is approximately proportional to the pressure which has to be exerted by the conical disks 5 and 6 upon the transmitting element 7 so as to prevent the latter from slipping between these disks, it is relatively simple to make the surface of piston 23, the angle of the V-shaped recesses in the cam projections 27 and 28, and the radial distance of these cam projections from shaft 1 of such dimensions that the torque-proportional hydraulic bracing pressure for piston 23 will provide the pressure which is required at that particular time at the other side of the transmission, that is, the driven side, for pressing the conical disks 5 and 6 against the transmitting element 7.

The pressure which has to be exerted by the conical disks 3 and 4 upon the transmitting element 7 is produced by the hydraulic pressure in the pressure chamber 10. The oil which is supplied to chamber 10 through the conduit 12 leaves this chamber again through radial bores 33 in shaft 1 which terminate into an annular channel 35 which surrounds the axially movable slide valve 34. One outer edge of this annular channel 35 and the adjacent edge of slide valve 34 together define a throttling passage 36 the varying size of which determines the strength of the hydraulic pressure which prevails in pressure chamber 10 and thus also the force of the pressure which the conical disks 3 and 4 exert upon the transmitting element 7. Behind this throttling passage 36, the oil may then pass out of the bore in shaft 1 through apertures 37 from which it may be returned in any suitable manner (not shown) to the suction side of the source of oil pressure.

The position of slide valve 34 in its axial direction and thus the aperture size of the throttling passage 36 is determined by a governor which is influenced by the speed of rotation of shaft 1 which is proportional to the speed of the engine, and by the particular power output of the engine as adjusted. Shaft 1 is for this purpose provided with flyweight members 40 which are pivotable about the axes 39 on a flange 38 on the end of shaft 1. The free ends of the radially directed arms 41 of these members 40 are adapted to act upon a flange 42 on slide valve 31 so as to reduce the aperture size of the throttling passage 36. This movement is, however, opposed by the size to which the output of the engine is adjusted since the output control lever, i.e. the accelerator of the engine is connected to a bushing 44 which is axially slidable on the shaft 43 of slide valve 34 and adapted to compress a spring 45 against the flange 42 in accordance with the position of the output control lever. By making this spring 45 of a suitable strength and the flyweight members 40 of suitable dimensions and weights, the governor will control the position of slide valve 34 in such a manner that, when the engine output is adjusted to a certain value and shaft 1 rotates at a certain speed, the pressure which is exerted by the conical disks 3 and 4 upon the transmitting element 7 will be so strong that a torque will be transmitted which is in accordance with the ratio between the power output and speed of shaft 1 without danger that the transmitting element 7 might slip relative to the conical disks.

If the transmission according to FIG. 1 is in its balanced position as illustrated and the power output of the engine is then suddenly increased, for example, for quickly passing another vehicle, the increase in speed of shaft 1 which then occurs results at first in a proportional increase of the torque which is to be transmitted between the piston 23 and the conical disks 3 and 4, and in a stronger compression of spring 45 and thus in a shifting movement of slide valve 34 toward the left of FIG. 1. Due to the resulting increase of the axial force which is then exerted by the balls or rollers 29 upon the piston 23, this piston will be shifted so as to reduce the size of the gap between its edge 32 and the adjacent edge of the annular groove 30 until the resulting throttling of the flow of the oil passing off through this gap produces in the rear cylinder chamber 25 a hydraulic pressure which is in balance with the axial force which is exerted by the balls 29 upon piston 23. This hydraulic pressure is also effective in the pressure chamber 11 of the other side of the transmission and immediately results in an increase of the pressure which i is exerted by the conical disks 5 and 6 upon the transmitting element 7.

The mentioned shifting movement of slide valve 34 toward the left of FIG. 1 results, however, in an increase of the size of the throttling passage 36 which causes the hydraulic pressure in the pressure chamber 10 to drop and the contact pressure to be reduced accordingly which is exerted by the conical disks 3 and 4 upon the transmitting element 7.

The result of both of these proceedings together is that the transmission will be quickly shifted to a lower driven speed, which means that, while the speed of shaft 2 remains the same, the speed of shaft 1 and thus the speed of the engine very quickly increases. This corresponds to the so-called "kickdown" effect of automatically changing gears which is comparable to changing down the gears of a vehicle which are shifted manually.

The adjustment of the speed ratio is completed when the speed of shaft has been so far increased that the flyweight members 40 have forced the slide valve 34 back to an axial position in which, due to the resulting increase of the hydraulic pressure in the pressure chamber 10, the pressure which is exerted by the conical disks 3 and 4 upon the transmitting element 7, corresponds to the opposing pressure with which this element tends to spread these disks apart.

The increase of the speed of shaft 1 results, however, also in a corresponding reduction of the torque which is to be transmitted between piston 23 and the conical disks 3 and 4, so that this piston will be shifted toward the right of FIG. 1 with the result that the hydraulic pressure in the rear cylinder chamber 25 and in the pressure chamber 11 of the other side of the transmission will be reduced.

Proceeding from this new state of balance of the transmission, the adjusting movements will gradually diminish the more the acceleration of the vehicle and thus the speed of shaft 2 increases. This occurs until the resistance to the movement of the vehicle which increases the more the speed of the vehicle increases requires a power output from shaft 2 which corresponds to the particular output to which the engine has been adjusted and which is transmitted from the engine to the transmission.

Different conditions, however, prevail if the vehicle is to be decelerated by means of the engine, that is, when the direction of the torque passing through the transmission is reversed and shaft 2 forms the drive shaft and shaft 1 the driven shaft. This also results in a reversal of the ratio between the pressure to be exerted by the conical disks 3 and 4 and that which has to be exerted by the disks 5 and 6 upon the transmitting element 7. In this connection, the well-known fact must be kept in mind that the transmitting element 7 always exerts a greater spreading force upon the conical disks of the driving side than upon those of the driven side of such a transmission.

If no special means were provided, this well-known fact would have the result when the direction of the torque in the transmission as illustrated in FIG. 1 is reversed that the pressure which is exerted by the disks 5 and 6 upon the transmitting element 7 can then no longer balance the spreading force which is exerted by this element upon these disks and that the radius of the transmitting element would therefore tend to decrease to the smallest possible size between the disks 5 and 6 on shaft 2 which is then the driving shaft and to increase accordingly to the largest possible size on shaft 1 which is then the driven shaft. This would mean that the engine of the vehicle would then run at an extremely low speed at which it can exert practically no longer any braking effect with the result that the vehicle would run away without any deceleration by the engines.

In order to prevent this, the invention provides the two flanks of each V-shaped recess of the cam projections 27 and 28, as illustrated in FIG. 2, to be differently inclined. The steeper flanks 46 and 47 will then be effective when the engine drives the shaft 1, while the less inclined flanks 48 and 49 will be effective when shaft 2 acts as a driving shaft. Since flanks 48 and 49 are less inclined than flanks 46 and 47, a certain torque which is to be transmitted between the piston 23 and the conical disks 3 and 4 requires a higher hydraulic pressure in the rear cylinder chamber 25 for balancing the axial force which is exerted by the balls or rollers 29 in operative association with the flanks 48 and 49. This hydraulic pressure may, however, be easily determined by making the flanks 48 and 49 of such an inclination that by means of the pressure in pressure chamber 11 the conical disks 5 and 6 will always be pressed against the transmitting element 7 with a force which balances the spreading force which this element exerts upon disks 5 and 6 when shaft 2 acts as the driving shaft.

However, this alone does not as yet result in a sufficient braking action by the engine since, when the accelerator is fully released, spring 45 will likewise be substantially released. Therefore, while the speed of shaft 1 at first remains unchanged, the flyweight members 40 may shift the slide valve 34 toward the right of FIG. 1, which causes the hydraulic pressure in pressure chamber 10 to be highly increased so that the conical disks 3 and 4 will be pressed against the transmitting element 7 at an excessive pressure which is out of any relation to the torque to be transmitted and causes the transmitting element 7 to exert such a spreading force upon the conical disks 5 and 6 which cannot be balanced by the hydraulic pressure in pressure chamber 11 even though this pressure is likewise increased. For employing the engine as a brake it is therefore necessary by means of the accelerator and the bushing 44 to simulate a condition on the slide valve 34 which corresponds to an increased driving output of the engine. This may be effected, for example, in a manner similar to that which is already known in motor vehicle transmission with mechanical means for pressing the conical disks against the transmitting element by retracting the accelerator of the engine beyond the neutral position which, although causing the spring 45 to be compressed, does not affect the power output of the engine. Slide valve 34 may then be moved by means of the accelerator in the manner as described for such a distance to the left that the transmitting element 7 will run with a large radius on shaft 2 and with a small radius on shaft 1 and the speed of the driven engine and thus also its braking power will increase.

In order to insure that both sides of the transmission as illustrated in FIG. 1 will always contain a minimum hydraulic pressure so that, for example, the reaction period of the transmission when starting to drive the vehicle will be shortened, a control or biasing valve 50 may be provided to affect the discharge of the oil from the rear cylinder chamber 25 and also from the openings 37.

The infinitely variable transmission as illustrated in FIG. 3 differs from that as shown in FIG. 1 essentially only by the fact that each transmission shaft 1 and 2 is provided with a torque indicator. That torque indicator which is located on the side of the transmission which is the driving side at that particular time determines in the manner as already described the force of the pressure which is required for pressing the conical disks at the driven side against the endless transmitting element 7, while the torque indicator at the side of the transmission which is then the driven side assists in determining the force of the pressure of the conical disks at the driving side. Due to these features which will become further apparent from the following description, the transmission as illustrated in FIG. 3 may be employed in practically all cases and not only as a transmission for a motor vehicle but also, for example, when at a varying power output a certain speed ratio should be maintained or when at a uniform power output different speed ratios are desired.

Each torque indicator of this embodiment of the invention comprises a flat annular control member 51 constituting a radially extending surface which is secured to the flange 26 of piston 23 which projects from the hydraulic cylinder 22. Upon this control member 51 the end of one arm of a two-armed lever 53 engages which is pivotable about a central axis 52. The end of the other arm of this lever acts upon a slide valve 54 and is adapted to shift the same against the action of a spring 55 in accordance with the particular axial position of piston 23 so that the aperture size of the throttling passage 57 which is formed between one edge of slide valve 54 and one edge of the annular chamber 56 which surrounds this slide valve will be changed and varying amounts of oil in accordance with the particular size of the passage 57 may be discharged through the conduit 58. For adjusting the piston 23 and slide valve 54 to the proper positions relative to each other during the assembly or installation of the transmission so as to compensate for unavoidable manufacturing tolerances, one of the ends of lever 53, preferably that which acts upon the slide valve 54, may be provided with a setscrew 59.

Of course, it also applies to this embodiment of the invention that the flanks of the V-shaped recesses are inclined at different angles to each other in the manner as illustrated in FIG. 2, so that on the particular side of the transmission which is the driving side the steeper flanks 46 and 47 and on the driven side the less inclined flanks 48 and 49 are located.

The amounts of oil flowing off through the conduits 58 flow to a slide valve 60 with two control edges for maintaining and varying the speed ratio and thus for finally determining the contact pressure which has to be exerted by the control disks at the driving side of the transmission. This slide valve 60 makes it possible to superimpose the throttling effect of one of slide valves 54 so as to affect a stronger throttling of the oil discharge. For this purpose, the outer end of slide valve 60 is acted upon by a two-armed lever 61 one end of which is inserted into and guided by the walls of an annular groove 62 in the outer peripheral surface of the conical disk 4 for maintaining the speed ratio as adjusted, while its other end is connected to a control member 63 for arbitrarily varying the speed ratio. If the transmission as illustrated in FIG. 3 is in the balanced condition and running with a speed ratio as set by the control member 63, the torque indicator on the drive shaft insures that at the other side of the transmission the conical disks will exert the contact pressure upon the transmitting element 7 which is in accordance with the load to which the transmission is subjected. The amount of oil flowing off from the slide valve which is associated with this torque indicator may then pass through the slide valve 60 without being throttled and flow back through conduit 64 to the suction side of the source of oil pressure. However, the amounts of oil which leave the slide valve which is associated with the torque indicator at the driven side of the transmission are throttled by slide valve 60 to such an extent that at the driving side that contact pressure of the conical disks will be effective which is required so that the speed ratio will remain as adjusted.

If, however, the speed ratio as set tends to change automatically for any reason, for example, in such a manner that the conical disk 4 on shaft 1 and the conical disk 6 on shaft 2 tend to move toward the right of FIG. 3, the two-armed lever 61 will then shift the slide valve 60 toward the right and thereby cause the oil current flowing off through the throttling passage 65 to be additionally throttled by the latter. This, in turn, causes the hydraulic pressure in pressure chamber 10 to be increased to such an extent that the movement of disks 4 and 6 toward the right will be immediately stopped provided the characteristic of slide valve 60 is made sufficiently steep so that very small movements of this slide valve will already result in very high changes in pressure.

If the speed ratio of the transmission according to FIG. 3 is to be arbitrarily changed, a procedure similar to that previously described will occur when the control member 63 is shifted toward the right of the drawing so that the radius of the transmitting element 7 on shaft 1 will be increased and that on shaft 2 will be accordingly reduced. The adjusting movement, that is, the change of the speed ratio, is completed as soon as disks 4 and 6 have moved so far toward the left that, when this movement is transmitted by the two-armed lever 61 to slide valve 60, the latter will be moved to a position in which the transmission will again be in a balanced condition.

The transmission as illustrated in FIG. 3 may, of course, also be employed in a motor vehicle if, instead of providing the slide valve 60 with the two-armed lever 61, a governor is provided as already described in detail with reference to the transmission as illustrated in FIG. 1.

Figure 4:
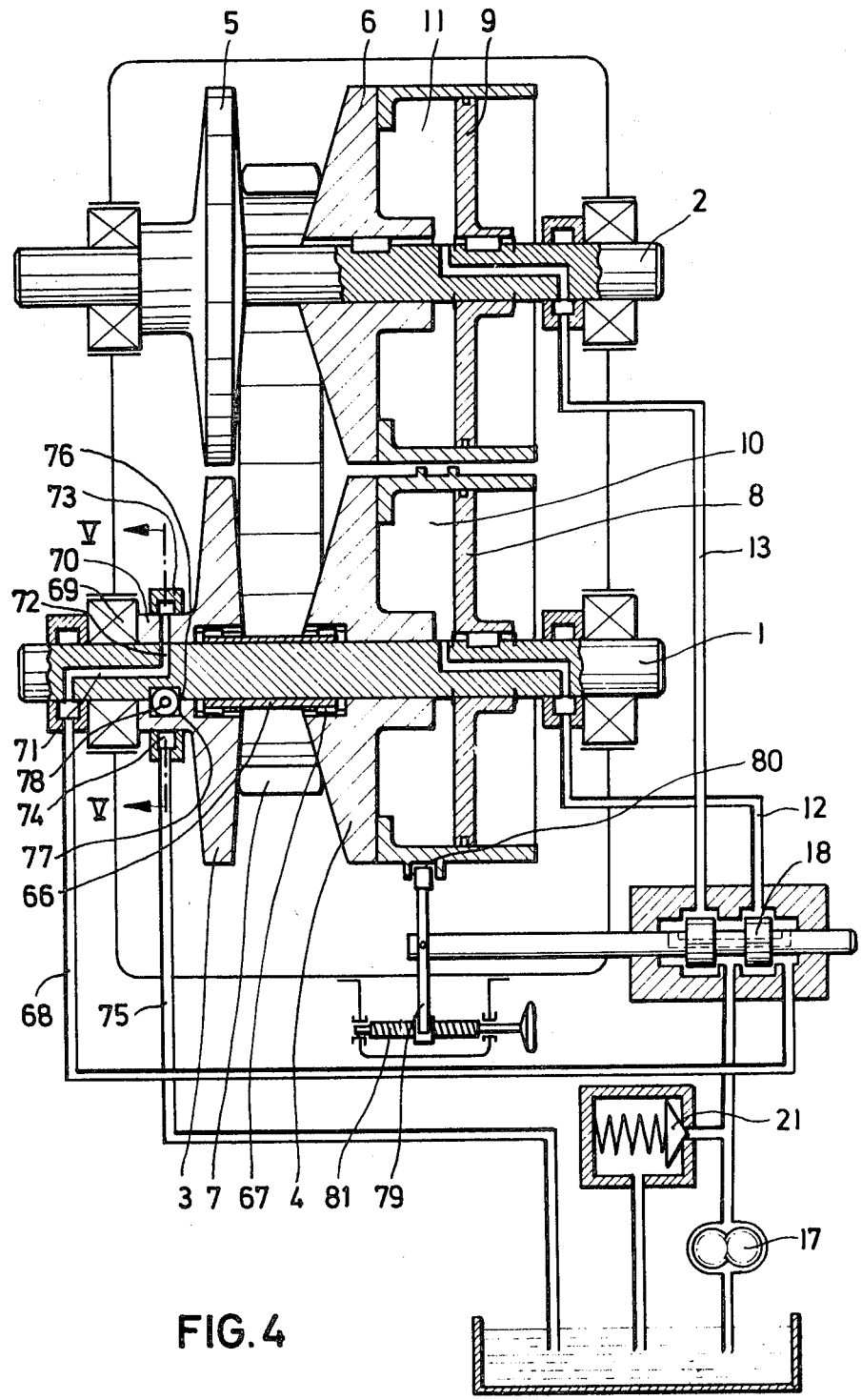
FIG. 4 shows a further embodiment of a transmission according to the invention.
Figure 7:
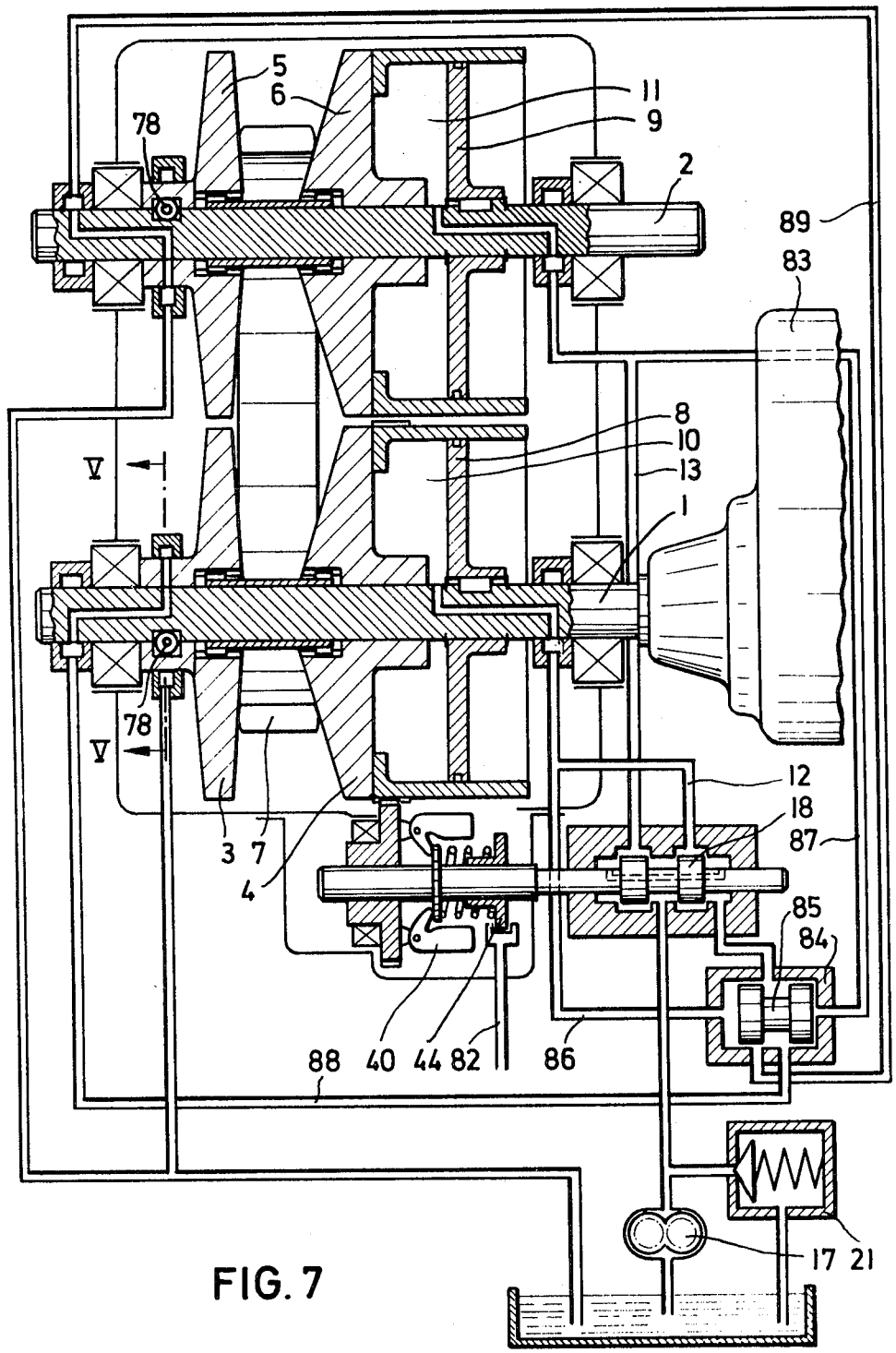

In each of the two transmission as illustrated in FIGS. 4 and 7 the oil is supplied by a pump 17 to a distributing slide valve 18 which is provided with four control edges and, as subsequently described in detail, distributes the oil to the conduits 12 and 13.

Figure 8:
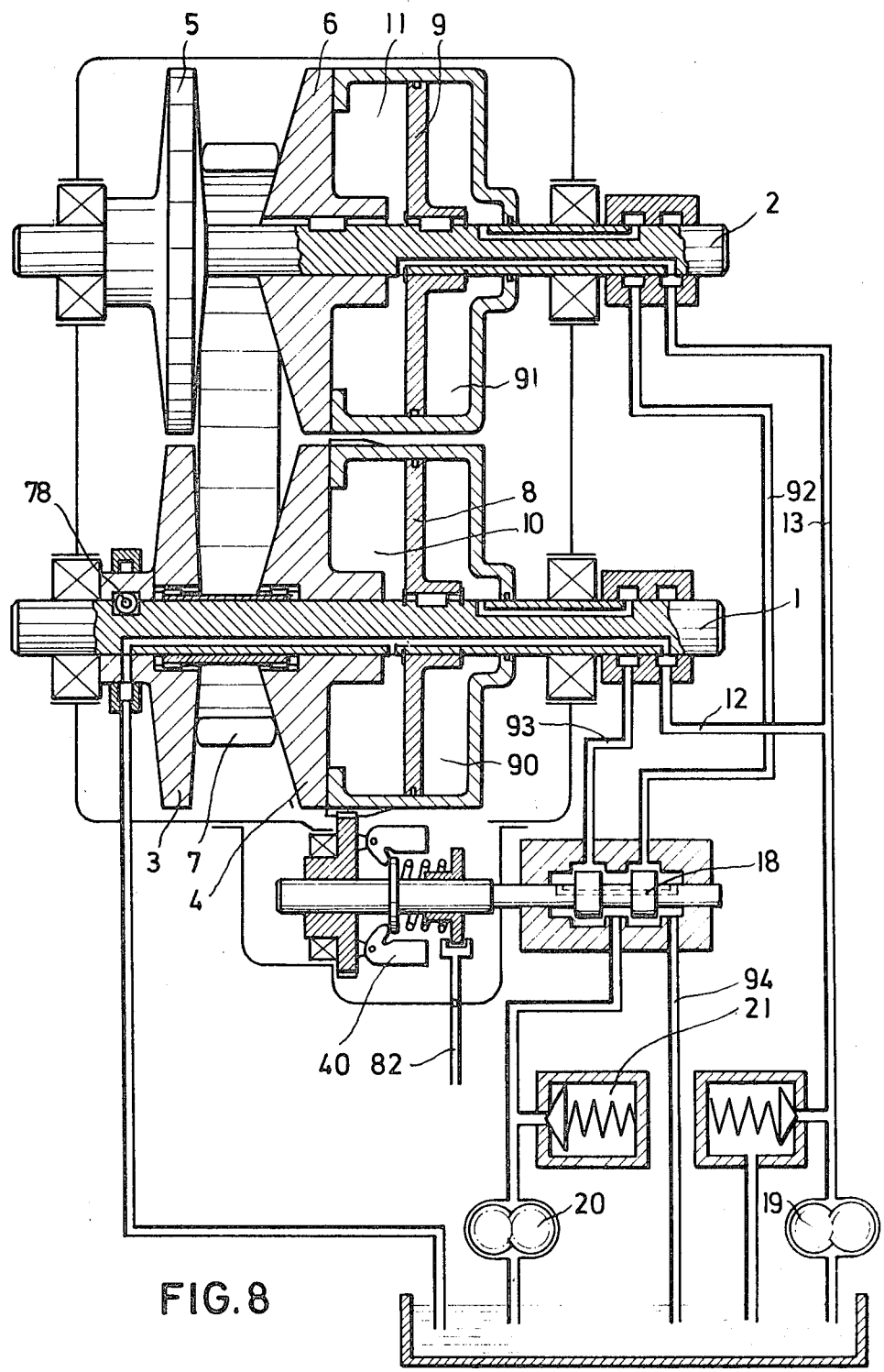
FIG. 8 shows a modification of the transmission according to FIG. 4, in which the hydraulic cylinders on the axially movable conical disks are provided in the form of double-acting cylinders.

FIGS. 4, 7 and 8 further illustrate pressure relief valves 21 which limit the hydraulic pressure which is supplied by the pumps to the respective transmissions and thus also limit the power which may be transmitted by these transmissions.

The infinitely variable transmission according to the further embodiment of the invention as illustrated in FIG. 4 only permits the driving torque to be transmitted in one direction so that shaft 1 forms the drive shaft and shaft 2 the driven shaft. The conical disk 4 is axially slidable relative to disk 3, but both disks are rotatable together about shaft 1 by being nonrotatably connected to each other by a bushing 66 which is provided with outer teeth 67 which engage into corresponding tooth gaps between internal teeth on the conical disks 3 and 4. At the other or driven side of the transmission, however, the conical disk 5 is rigidly secured to shaft 2, while the other conical disk 6 which forms a part of a hydraulic cylinder is axially slidable but nonrotatable on shaft 2.

The oil which is supplied under pressure by pump 17 is distributed to the pressure chambers 10 and 11 of both sides of the transmission by means of a slide valve 18 which is provided with four control edges.

Figure 5:
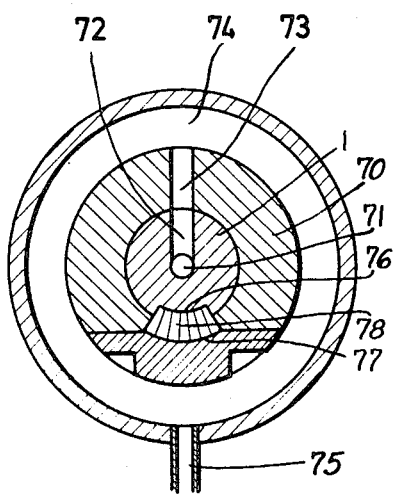
FIGS. 5 and 6 show similar cross sections which are taken along the line V—V of FIG. 4 and illustrate the torque indicator according to FIG. 4 in two different operating positions.
Figure 6:
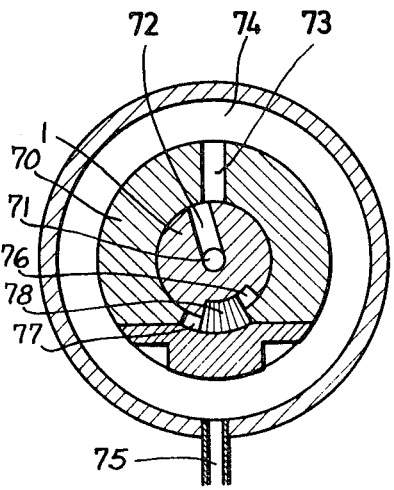

In order to adjust the hydraulic pressure in pressure chamber 11 of the driven side of the transmission and thus the contact pressure upon the transmitting element 7 by the conical disks 5 and 6 so as to be in proportion to the torque which is exerted upon shaft 1 as torque indicator as subsequently described in detail with reference to FIGS. 5 and 6 is mounted on shaft 1 and connected into the oil return line 68 through which the oil flows from the outer control edges of slide valve 18 under the pressure which prevails in the pressure chamber 11.

The conical disk 3 which has a flange 70 surrounding shaft 1 without play is prevented from moving axially along this shaft away from the transmitting element 7, for example, by its flange 70 abutting against the bearing 69 of shaft 1. The pressure oil flowing through the return line 68 passes through an axial bore 71 and a following radial bore 72 in shaft 1 and then from this radial bore 72 into a likewise radial bore 73 in flange 70 which terminates into an annular chamber 74 which surrounds the flange 70 and from which the oil may flow back through the conduit 75 to the suction side of pump 17.

The connection between the adjacent ends of the radial bores 72 and 73 forms an adjustable throttling passage the aperture size of which depends upon the particular rotary position of the conical disk 3 on shaft 1 and determines the hydraulic pressure in pressure chamber 11 and thus also determines at the same time (contrary to the transmissions according to FIGS. 1 and 3) the pressure ratio of the chambers 10 and 11. For insuring that this hydraulic pressure will be proportional to the torque which is transmitted to shaft 1, flange 70 of disk 3 and shaft 1 are provided with adjacent recesses 76 and 77 which may be located substantially diametrically opposite to the bores 72 and 73 and into which a spring element 78 is inserted which acts in the peripheral direction of shaft 1 and one side of which is supported by shaft 1 and the other side by flange 70.

If a torque is transmitted to shaft 1 and further transmitted by the latter through the spring element 78 to the conical disk 3 and thus also to the conical disk 4, this torque causes the spring element 78 to be compressed to a certain extent, for example, from the position as shown in FIG. 5 to the position as shown in FIG. 1. In accordance with this compression of spring element 78 the conical disks 3 and 4 are then turned for a corresponding distance relative to shaft 1 so that the bores 72 and 73 will then be disposed at an angle to each other, for example, as shown in FIG. 6, and the size of the throttling passage between them will then be reduced accordingly. Consequently, provided the spring element 78 is made of the proper compressive strength, the flow of the pressure oil passing through the return line 68 will be throttled to such an extent that the contact pressure which is exerted by the conical disks 5 and 6 upon the transmitting element 7 will be sufficient for transmitting the torque to which shaft 1 is subjected. Accordingly, the transmitting element 7 then exerts a spreading force upon the conical disks 3 and 4 which is greater than the contact pressure which is produced on shaft 2. Since disk 4 should resist this spreading force, slide valve 18 must be shifted slightly to the right of its neutral position so that the hydraulic pressure will be increased in conduit 12 and thus also in pressure chamber 10. For this purpose, the outer end of the rod of slide valve 18 is pivotably connected to a two-armed lever 79 one end of which is slidable within an annular groove 80 in the conical disk 4, while its other end is connected to a nut on a spindle 81 which permits the transmission ratio to be adjusted to the desired size. If disk 4 then tends to yield to the spreading force which is exerted thereon by the transmission element 7, this immediately causes a shifting movement of slide valve 18 toward the right. If the characteristic of slide valve 18 is sufficiently steep, it will only require the conical disk 4 to be shifted for an extremely short distance until the hydraulic pressure in pressure chamber 10 will be increased to such an extent that the yielding movement of disk 4 will be stopped.

In order to design a transmission similar to that as shown in FIG. 4 in a manner so as to permit it to transmit a torque in either direction, it is necessary to design both sides of the transmission in the same manner as the side which contains the shaft 1 in FIG. 4. Therefore, each shaft should then be provided with a torque indicator, for example, of the type as illustrated in FIGS. 5 and 6, so that the torque indicator which is mounted on the shaft which then acts as the driving shaft may be connected to the oil return line in which the hydraulic pressure prevails which is present at the driven side of the transmission. This may be effected by a switch valve 84, as shown in FIG. 7, which is inserted into the return line of the oil flowing past the outer control edges of the four-edge slide valve 18. The hydraulic pressure in pressure chamber 10 and 11 is for this purpose conducted through conduits 86 or 87 to the opposite surfaces of the double piston 85 of slide valve 84 so that this piston will be shifted by the higher hydraulic pressure in the respective driving side of the transmission to one or the other of its end positions in which the torque indicator of the respective driving side is then connected by the conduit 88 or 89 to the oil return line of slide valve 18. When the double piston 85 is in the position as illustrated in FIG. 7, shaft 1 forms the driving shaft since a higher hydraulic pressure than prevails in pressure chamber 10 and then also in conduit 86 than in pressure chamber 11 and in conduit 87.

If the transmission as illustrated in FIG. 7 is in a balanced position and the output of the engine is then suddenly increased, slide valve 18 will be suddenly shifted toward the left by the accelerator lever 82 which acts upon the bushing 44. This causes the hydraulic pressure in pressure chamber 10 to be reduced and the hydraulic pressure in pressure chamber 11 to be increased in accordance with the increased torque to which shaft 1 is subjected. Therefore, while the speed of shaft 2 of the transmission at first remains unchanged, the driving speed of shaft 2 increases. The adjustment will be completed as soon as, due to the increased speed of shaft 1, the flyweight members 40 have shifted the slide valve 18 again back so far toward the right that a hydraulic pressure will be produced in pressure chamber 10 which is equal to the spreading force which is exerted by the transmitting element 7 upon disks 3 and 4. In accordance with the law applicable to infinitely variable gears which are operated by conical pulley disks, this hydraulic pressure will be higher than that which prevails in pressure chamber 11 which has the result that the double piston 84 will then be shifted to the position as illustrated in FIG. 7 and the torque indicator on shaft 1 will be active and build up in pressure chamber 11 a hydraulic pressure which is proportional to the torque to which shaft 1 is subjected. When the speed of the vehicle then increases, the torque which is delivered by shaft 2 decreases and thus also the spreading force which the transmitting element 7 exerts upon the conical disks 3 and 4. The transmission is therefore adjusted toward higher driven speeds until a new state of balance is reached between the engine output and the driving resistance of the vehicle and thus a state of balance of the speed ratio to which the transmission is adjusted.

If, on the other hand, the vehicle is to be decelerated by means of the engine 83, it again becomes necessary by means of the accelerator lever 82 to simulate in the governor a condition of an increased output of the engine 83 without actually increasing the same. Slide valve 18 is therefore shifted from its neutral position toward the left. This causes the hydraulic pressure in conduits 12 and 86 and in pressure chamber 10 to be reduced and the hydraulic pressure in conduits 13 and 89 and in pressure chamber 11 to be increased, while at the same time shaft 2 starts to drive so that the double piston 85 will be shifted from its right end position as illustrated to the opposite left end position so that the torque indicator on shaft 2 will then become effective. The conical disks 5 and 6 will then move toward each other, while disks 3 and 4 move away from each other so that, while shaft 2 at first continues to run at the same speed, the speed of shaft 1 and thus the decelerating action of the engine 83 will increase until due to the effect of the flyweight members 40 the slide valve 18 has been shifted back toward the right to a new balanced position.

Of course, if the transmission is to be employed for a purpose other than in a motor vehicle, the governor of the transmission as illustrated in FIG. 7 may also be replaced by a control member similar to the two-armed lever 79 in FIG. 4.

The same applies to the transmission as illustrated in FIG. 8, in which a common torque indicator is employed on shaft 1 for rendering the contact pressures of the conical disks at the driving and driven shafts of the transmission responsive to the respective loads upon these shafts. The conical disks 4 and 6 are for this purpose provided in the form of double-acting pressure cylinders so that, aside from the pressure chambers 10 and 11 for producing the load-responsive contact pressures, additional pressure chambers 90 and 91 are provided for producing the proper relation between the contact pressures at the driving and driven sides of the transmission by means of the slide valve 18 which is again provided with four control edges. These pressure chambers 10, 11 and 90, 91 for the two mentioned purposes may be employed to form two separate hydraulic circuits each of which is supplied with oil under pressure by a pump 19 or 20, respectively, or by a pump which is provided with a flow distributor. The provision of two pumps has the considerable advantage especially in an infinitely variable cone pulley transmission which is intended for transmitting very high powers that high hydraulic pressures which are required for producing the load-responsive contact pressures may be produced by a high-pressure pump 19 which, however, does hot have to be designed so as to supply large amounts of pressure oil, while the considerably lower hydraulic pressure for attaining the proper ratio between the contact pressures at the driving and driven sides of the transmission may be produced by a low-pressure pump 20 which may easily supply the large amounts of pressure oil which flow off through the slide valve 18.

In the transmission as illustrated in FIG. 8, the oil is supplied by a pump 19 to the conduits 12 and 13, while a second pump 20 supplies the oil to a second hydraulic circuit in which a distributing slide valve 18 with four control edges is provided.

By designing the conical disks 4 and 6 in the form of double-acting hydraulic cylinders with pressure chambers tending to counteract each other, it is, however, necessary to conduct the hydraulic pressure as supplied by the slide valve 18 to the driven side of the transmission in a manner as will hereafter be described in detail with reference to FIG. 8.

Assuming that shaft 1 acts as the driving shaft, the torque indicator on this shaft will maintain a hydraulic pressure in pressure chamber 10 and 11 which is proportional to the torque to which shaft 1 is subjected. However, since the contact pressure which is exerted by disks 3 and 4 upon the transmitting element 7 must have approximately 1½ times the size of the contact pressure which is exerted by the conical disks 5 and 6, the possible contact pressure of disks 5 and 6 which is produced by the hydraulic pressure in pressure chamber 11 which is equal to that in pressure chamber 10 must be opposed by a force which reduces the effect of the hydraulic pressure in chamber 11 to the required size. This is attained by conducting the hydraulic pressure which is supplied from slide valve 18 through conduit 92 to pressure chamber 91 so that the contact pressure which is actually exerted by disks 5 and 6 upon the transmitting element 7 will be the result of the difference between the pressures prevailing in pressure chambers 11 and 91. In the meantime, pressure chamber 90 which is connected by conduit 93 to slide valve 18 remains practically without effect since the amounts of oil flowing via the outer control edges of slide valve 18 flow back without pressure through conduit 94 to the suction side of pump 19 and 20.

If the accelerator lever 82 is suddenly shifted so as to accelerate the vehicle, the speed of shaft 1 will at first remain unchanged, while slide valve 18 will either be shifted to a central position in which there is practically no hydraulic pressure in pressure chamber 90 and also in pressure chamber 91 since the entire amount of oil supplied by pump 20 can then flow off freely through slide valve 18 and conduit 94, or slide valve 18 will even be shifted to a position in which pressure chamber 91 will be without pressure, while a hydraulic pressure is built-up via the conduit 93 in pressure chamber 90. Either of these procedures leads to a more or less rapid adjustment of the transmission to a different speed ratio so that while shaft 2 continues to run at the same speed, the speed of shaft 1 increases. As the speed of shaft 1 then increases, the flyweight members 40 will move the slide valve 18 again back until the transmission is in a balanced condition at the particular speed ratio as adjusted so that the driving resistance of the vehicle corresponds to the output to which the engine has been adjusted.

The conditions are similar when the vehicle is to be decelerated by means of the engine except that the speed of shaft 2 decreases the more the speed of the vehicle decreases, while the speed of shaft 1 which is connected to the engine remains the same since a reduction of the speed of this shaft will immediately cause the flyweight members 40 to shift the slide valve 18 farther toward the left and thereby produce an increase of the hydraulic pressure in pressure chamber 90 and thus reduce the radius of the transmitting element 7 between the conical disks 3 and 4. As long as the accelerator lever 82 remains in the same braking position, the flyweight members 40 insure that the speed of shaft 1 and thus the decelerating effect of the engine will remain practically constant even though the speed of shaft 2 continuously decreases.

Regarding the torque indicator as illustrated in FIGS. 4 to 8 it may finally be added that the bores 72 and 73 must, of course, be made of such a cross-sectional size that at a torque-proportional change of the position of shaft 1 or 2 relative to that of flange 70 of disk 3 or 5, which change is dependent upon the characteristic of spring 78, the flow of the pressure oil passing through the torque indicator will be throttled as desired.

Although our invention has been illustrated and described with reference to the preferred embodiments thereof, we wish to have it understood that it is in no way limited to the details of such embodiments but is capable of numerous modifications within the scope of the appended claims.

Having thus fully disclosed our invention, what we claim is:

1. An infinitely variable cone pulley transmission having a drive and driven shafts, at least two pairs, each composed of first and second conical pulley disks, one pair on each said shafts, at least one endless transmitting element connecting and running between said two pairs of conical pulley disks, wherein one disk of each pair on the drive and driven shafts is movable in the axial direction relative to the other disk and wherein hydraulic fluid supply means create solely the contact pressures with which the conical disks are applied against the transmitting element at both sides of the transmission in a manner so as to be automatically load-responsive, for which purpose the axially movable conical disks are constituted by rotating hydraulic cylinders connected to said fluid supply means each containing a piston rigidly connected to the associated shaft, said transmission further having a slide valve for maintaining and varying the speed ratio of the transmission, in which at least the driving side of the transmission is provided with an indicator for indicating the torque which is transmitted at that side, and means connected to said indicator and responsive to changes in the torque indication thereof to vary the supply of fluid to the cylinder at the driven side so as to vary the hydraulic contact pressure which is applied at the driven side, said varying means including at least two elements movable relative to each other in response to variations in torque.

2. A transmission as defined in claim 1, in which the first conical disk of one pair is fixed to the drive shaft and forms a third rotating hydraulic cylinder; this cylinder containing a third piston which is rotatable on and axially slidable along the drive shaft and serves for transmitting the torque between a motor and the conical disk fixed to the drive shaft and divides the third cylinder into a front chamber and a rear chamber which is acted upon by the hydraulic pressure of the driven side of the transmission; the third piston and the conical disk fixed to the drive shaft carrying within the front chamber of this cylinder cam projections extending in the axial direction toward each other and having V-shaped recesses between which rolling members for transmitting the torque are positioned, said cylinder and third piston constituting said relatively movable elements; said varying means including a throttling element operatively connected with said third piston for determining the hydraulic pressure acting at the driven side and in the rear cylinder chamber, whereby this hydraulic pressure will correspond to the pressure which is required at the driven side for producing the contact pressure at that side and will balance the axial forces which are exerted upon the piston by the cam projections.

3. A transmission as defined in claim 2, in which said drive shaft has within the rear chamber an annular groove and a radial bore opening into the groove and a following axial bore for the escape of hydraulic fluid from the rear cylinder chamber; said throttling element comprising a control edge carried by a third piston cooperating with said annular groove.

4. A transmission as defined in claim 2, in which the third piston is provided with a tubular flange which extends axially out of the rear cylinder chamber and is provided with a radially extending surface, a two-armed lever, a second slide valve, a spring acting on said second slide valve, one end of said two-armed lever engaging said annular surface, said two-armed lever being pivotably mounted between its ends and the other end of said two-armed lever engaging said second slide valve so as to actuate the same against the action of said spring, a return line for the fluid which has been conducted to the driven side of the transmission and to the rear cylinder chamber on the drive shaft, said second slide valve being adapted to throttle the return flow of the oil through said return line.

5. A transmission as defined in claim 4, including means to adjust the effective length of at least one of the arms of the two-armed lever.

6. A transmission as defined in claim 4, including means to adjust the pivot point of the two-armed lever to different positions.

7. A transmission as defined in claim 2, in which the flanks of each V-shaped recess are inclined at different angles so that the steeper flanks engage with and bear on the rolling members when the transmission is driven at its normal driving side, while the less inclined flanks engage with and bear on the rolling members when the normal driven side becomes the driving side of the transmission.

8. A transmission as defined in claim 1, including a bushing carrying the conical disks rotatably mounting the disks on the driving shaft nonrotatably relative to each other; means to effect torque transmission between the driving shaft and the conical disks on said bushing comprising a spring element which is effective in the direction of rotation of the drive shaft; said varying means including a throttling element adapted to be adjusted for determining the hydraulic pressure acting at the driven side of the transmission; said spring element being operatively connected to said throttling element to change the setting thereof in response to torque variations.

9. A transmission as defined in claim 8, having a flange which surrounds the drive shaft without play and is integral with the second conical disk on the drive shaft means, preventing said second conical disk from sliding axially away from the endless transmitting element; one side of said spring element acting in the peripheral direction on the drive shaft and the other side acting upon said flange; and the drive shaft being provided with an axial bore which is continued by a radial bore; the flange being provided with a radial bore; and the adjacent ends of the two radial bores constituting said throttling element.

10. A transmission as defined in claim 1, including means to supply the two sides of the transmission independently of each other with oil under pressure; the first conical disk of one pair being fixed to the drive shaft; the part of the drive shaft carrying the fixed conical disk having a coaxial bore, said varying means including a slide valve in said bore which is adapted to maintain and to vary the speed ratio of the transmission and determines the contact pressure of the conical disks at this side of the transmission against the transmitting element; said indicator includes a governor acting on this slide valve which is operative in response to the speed of the shaft at the driving side of the transmission and to the power output of the driving motor as adjusted.

11. A transmission as defined in claim 1, for maintaining and varying the speed ratio of the transmission, includes means to supply oil under pressure to both sides of the transmission, said supply means including a distributing slide valve having four control edges; a return line for oil passing said distributing slide valve; and said varying means comprising a torque-responsive throttling element positioned in said return line to control the amounts of oil flowing past the outer control edges of the distributing slide valve.

12. A transmission as defined in claim 1, in which the cylinders containing the fixed pistons forming inner and outer chambers on opposite sides of the pistons; said fluid supply means supplying fluid to the chamber on the other side of the piston from the conical disk; a second fluid supply means connected to each cylinder chamber located between the associated slidable disk and the fixed piston, the strength of said second fluid supply means being determined by the torque indicator so as to be load-responsive, for which purpose the oil which is supplied by the second source flows off through the torque indicator; the first fluid supply means including a distributing slide valve having four control edges to vary the pressure, which counteracts the pressure which is supplied by the second source.

13. A transmission as defined in claim 1, in which said supply means includes means to supply both sides of the transmission independently of each other with oil under pressure; the load-responsive contact pressures of the driven side being determined by the torque acting upon the driving side; and a return line from at least one side; and slide valve means in said return line for controlling the amounts of oil flowing off through the return line, said slide valve means having two control edges for maintaining and varying the speed ratio of the transmission.

14. A transmission as defined in claim 11, in which each side of the transmission is provided with a torque-responsive throttling element, a return line from at least one side, a switch valve which is controlled by the higher hydraulic pressure of the respective driving side coming from the distributing slide valve with four control edges, the throttling element at the driving side of the transmission being connected in the return line to control the oil flowing off past the outer control edges of the slide valve.

15. A transmission as defined in claim 11, in which one of the axially slidable conical disks has an annular groove in its peripheral surface, and in which for maintaining and varying the speed ratio of the transmission a two-armed control lever is provided which acts upon the slide valve and has one end slidably engaging into said annular groove while its other end is connected to an element for arbitrarily varying the speed ratio of the transmission.

16. A transmission as defined in claim 11, in which the means for maintaining and varying the speed ratio of the transmission includes a governor which is affected by the speed of the shaft which is connected to the motor and by the power output of the motor as adjusted, said governor acting on said slide valve.